United States Patent
Mleczko et al.

(10) Patent No.: US 11,245,819 B2
(45) Date of Patent: Feb. 8, 2022

(54) VEHICULAR CAMERA MODULE

(71) Applicant: MAGNA ELECTRONICS INC., Auburn Hills, MI (US)

(72) Inventors: Jamie A. Mleczko, Washington, MI (US); Jonathan D. Conger, Berkley, MI (US); Steven V. Byrne, Goodrich, MI (US); Yuesheng Lu, Farmington Hills, MI (US)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 0 days.

(21) Appl. No.: 17/301,174

(22) Filed: Mar. 29, 2021

(65) Prior Publication Data

US 2021/0218867 A1 Jul. 15, 2021

Related U.S. Application Data

(63) Continuation of application No. 16/679,385, filed on Nov. 11, 2019, now Pat. No. 10,965,846, which is a
(Continued)

(51) Int. Cl.
*H04N 5/225* (2006.01)
*G08G 1/16* (2006.01)
*G08G 1/0962* (2006.01)

(52) U.S. Cl.
CPC ........... *H04N 5/2252* (2013.01); *G08G 1/166* (2013.01); *H04N 5/2253* (2013.01);
(Continued)

(58) Field of Classification Search
CPC ...... G08G 1/165; G08G 1/166; H04N 5/2252; H04N 5/2253; H04N 5/2254
See application file for complete search history.

(56) References Cited

U.S. PATENT DOCUMENTS

| 5,204,615 A | 4/1993 | Richards et al. |
| 5,525,264 A | 6/1996 | Cronin et al. |

(Continued)

FOREIGN PATENT DOCUMENTS

| DE | 102014117648 A1 | 6/2016 |
| DE | 102015121396 A1 | 6/2017 |

(Continued)

*Primary Examiner* — Amy R Hsu
(74) *Attorney, Agent, or Firm* — Honigman LLP

(57) ABSTRACT

A vehicular camera module includes a metal front housing, a printed circuit board housed by the metal front housing, a lens holder disposed at the metal front housing with the lens aligned with an imager at the printed circuit board, a metal rear housing joined with the metal front housing, and a coaxial connecting element. With the metal rear housing joined with the metal front housing, an inward-extending portion of the coaxial connecting element extends inward of the metal rear housing towards the metal front housing and electrically connects with circuitry at the printed circuit board. With the metal rear housing joined with the metal front housing, a plurality of spring tabs make, via spring contact, an electrical connection between the circuitry at the printed circuit board and the metal rear housing. An outward-extending portion of the coaxial connecting element is configured for coaxial electrical connection to a vehicle connector.

58 Claims, 8 Drawing Sheets

Related U.S. Application Data continuation of application No. 16/297,790, filed on Mar. 11, 2019, now Pat. No. 10,477,083, which is a continuation of application No. 15/487,459, filed on Apr. 14, 2017, now Pat. No. 10,230,875, and a continuation-in-part of application No. 15/341,048, filed on Nov. 2, 2016, now Pat. No. 10,250,004.

(60) Provisional application No. 62/322,334, filed on Apr. 14, 2016, provisional application No. 62/251,243, filed on Nov. 5, 2015.

(52) U.S. Cl.
CPC ......... *H04N 5/2254* (2013.01); *H04N 5/2257* (2013.01); *B60R 2300/40* (2013.01); *G08G 1/09623* (2013.01); *G08G 1/167* (2013.01)

(56) References Cited

U.S. PATENT DOCUMENTS

| | | |
|---|---|---|
| 5,550,677 A | 8/1996 | Schofield et al. |
| 5,559,556 A | 9/1996 | Kagebeck |
| 5,657,539 A | 8/1997 | Orikasa et al. |
| 5,670,935 A | 9/1997 | Schofield et al. |
| 5,821,532 A | 10/1998 | Beaman et al. |
| 5,854,708 A | 12/1998 | Komatsu et al. |
| 5,872,332 A | 2/1999 | Verma |
| 5,920,061 A | 7/1999 | Feng |
| 5,949,331 A | 9/1999 | Schofield et al. |
| 5,978,017 A | 11/1999 | Tino |
| 6,002,511 A | 12/1999 | Varaprasad et al. |
| 6,013,372 A | 1/2000 | Hayakawa et al. |
| 6,071,606 A | 6/2000 | Yamazaki et al. |
| 6,072,814 A | 6/2000 | Ryan et al. |
| 6,117,193 A | 9/2000 | Glenn |
| 6,151,065 A | 11/2000 | Steed et al. |
| 6,178,034 B1 | 1/2001 | Allemand et al. |
| 6,193,378 B1 | 2/2001 | Tonar et al. |
| 6,222,447 B1 | 4/2001 | Schofield et al. |
| 6,259,475 B1 | 7/2001 | Ramachandran et al. |
| 6,292,311 B1 | 9/2001 | Bohn et al. |
| 6,481,003 B1 | 11/2002 | Maeda |
| 6,483,101 B1 | 11/2002 | Webster |
| 6,535,242 B1 | 3/2003 | Strumolo et al. |
| 6,559,439 B1 | 5/2003 | Tsuchida et al. |
| 6,590,658 B2 | 7/2003 | Case et al. |
| 6,603,612 B2 | 8/2003 | Nakano |
| 6,651,187 B2 | 11/2003 | Lacey, III |
| 6,654,187 B2 | 11/2003 | Ning |
| 6,805,767 B2 | 10/2004 | Shinomiya |
| 6,897,432 B2 | 5/2005 | Schmidtke et al. |
| 7,015,944 B2 | 3/2006 | Holz et al. |
| 7,031,075 B2 | 4/2006 | Tsuji |
| 7,095,123 B2 | 8/2006 | Prior |
| 7,095,572 B2 | 8/2006 | Lee et al. |
| 7,097,469 B2 | 8/2006 | Jacobs |
| 7,215,479 B1 | 5/2007 | Bakin |
| 7,268,957 B2 | 9/2007 | Frenzel et al. |
| 7,289,037 B2 | 10/2007 | Uken et al. |
| 7,391,458 B2 | 6/2008 | Sakamoto |
| 7,419,315 B2 | 9/2008 | Hirata et al. |
| 7,423,665 B2 | 9/2008 | Ray et al. |
| 7,453,509 B2 | 11/2008 | Losehand et al. |
| 7,480,149 B2 | 1/2009 | DeWard et al. |
| 7,536,316 B2 | 5/2009 | Ozer et al. |
| 7,599,134 B2 | 10/2009 | Bechtel et al. |
| 7,665,915 B2 | 2/2010 | Lee |
| 7,697,056 B2 | 4/2010 | Huang |
| 7,768,574 B2 | 8/2010 | Humpston |
| 7,965,336 B2 | 6/2011 | Bingle et al. |
| 8,120,652 B2 | 2/2012 | Bechtel et al. |
| 8,256,821 B2 | 9/2012 | Lawlor et al. |
| 8,318,512 B2 | 11/2012 | Shah et al. |
| 8,356,950 B2 | 1/2013 | Sato et al. |
| 8,482,664 B2 | 7/2013 | Byrne et al. |
| 8,506,185 B2 | 8/2013 | Sato et al. |
| 8,542,451 B2 | 9/2013 | Lu et al. |
| 8,570,374 B2 | 10/2013 | Betham et al. |
| 8,781,442 B1* | 7/2014 | Link, II ............... H04L 9/3297 455/411 |
| 8,790,121 B2 | 7/2014 | Hirakawa |
| 8,866,012 B2 | 10/2014 | Engelbach et al. |
| 8,866,907 B2 | 10/2014 | McElroy et al. |
| 8,994,878 B2 | 3/2015 | Byrne et al. |
| 9,066,446 B1* | 6/2015 | Olsson ............... H04N 5/23203 |
| 9,210,307 B2 | 12/2015 | Gebauer et al. |
| 9,233,641 B2 | 1/2016 | Sesti et al. |
| 9,277,104 B2 | 3/2016 | Sesti et al. |
| 9,338,334 B2 | 5/2016 | Lu et al. |
| 9,365,160 B2 | 6/2016 | Byrne et al. |
| 9,451,138 B2 | 9/2016 | Winden et al. |
| 9,487,159 B2 | 11/2016 | Achenbach |
| 9,565,342 B2 | 2/2017 | Sauer et al. |
| 9,596,387 B2 | 3/2017 | Achenbach et al. |
| 9,621,769 B2 | 4/2017 | Mai et al. |
| 9,986,136 B2 | 5/2018 | Newiger |
| 9,992,392 B2 | 6/2018 | Byrne et al. |
| 10,079,458 B2 | 9/2018 | Hehir et al. |
| 10,230,875 B2 | 3/2019 | Mleczko et al. |
| 10,250,004 B2 | 4/2019 | Conger et al. |
| 10,447,902 B2 | 10/2019 | Grimes et al. |
| 10,477,083 B2 | 11/2019 | Mleczko et al. |
| 10,965,846 B2 | 3/2021 | Mleczko et al. |
| 2002/0167605 A1 | 11/2002 | Akimoto et al. |
| 2002/0175832 A1 | 11/2002 | Mizusawa |
| 2003/0090569 A1 | 5/2003 | Poechmueller |
| 2003/0137595 A1 | 7/2003 | Takachi |
| 2005/0104995 A1 | 5/2005 | Spryshak et al. |
| 2005/0141106 A1 | 6/2005 | Lee et al. |
| 2005/0190283 A1 | 9/2005 | Ish-Shalom et al. |
| 2005/0274883 A1 | 12/2005 | Nagano |
| 2006/0049533 A1 | 3/2006 | Kamoshita |
| 2006/0050018 A1 | 3/2006 | Hutzel et al. |
| 2006/0054802 A1 | 3/2006 | Johnston |
| 2006/0056077 A1 | 3/2006 | Johnston |
| 2006/0061008 A1 | 3/2006 | Karner et al. |
| 2006/0065436 A1 | 3/2006 | Gally et al. |
| 2006/0077575 A1 | 4/2006 | Nakai et al. |
| 2006/0103727 A1 | 5/2006 | Tseng |
| 2006/0125919 A1 | 6/2006 | Camilleri et al. |
| 2006/0171704 A1* | 8/2006 | Bingle ................. H04N 5/2254 396/419 |
| 2006/0184297 A1 | 8/2006 | Higgins-Luthman |
| 2007/0040034 A1 | 2/2007 | Hennick |
| 2007/0096020 A1 | 5/2007 | Mitsugi et al. |
| 2007/0279518 A1 | 12/2007 | Apel et al. |
| 2008/0024883 A1 | 1/2008 | Iwasaki |
| 2008/0043105 A1 | 2/2008 | Kallhammer et al. |
| 2008/0122965 A1 | 5/2008 | Fang |
| 2009/0010494 A1 | 1/2009 | Bechtel et al. |
| 2009/0012203 A1 | 1/2009 | Nakanishi et al. |
| 2009/0244361 A1 | 10/2009 | Gebauer et al. |
| 2009/0295181 A1 | 12/2009 | Lawlor et al. |
| 2010/0015713 A1 | 1/2010 | Deeter et al. |
| 2010/0097519 A1 | 4/2010 | Byrne et al. |
| 2010/0103308 A1 | 4/2010 | Butterfield et al. |
| 2010/0128455 A1 | 5/2010 | Ophoven et al. |
| 2010/0216356 A1 | 8/2010 | Takehara |
| 2010/0279439 A1 | 11/2010 | Shah et al. |
| 2011/0025850 A1 | 2/2011 | Maekawa et al. |
| 2011/0070770 A1 | 3/2011 | Sakai |
| 2011/0096524 A1 | 4/2011 | Kameyama |
| 2011/0104929 A1 | 5/2011 | Suzuki et al. |
| 2011/0298968 A1 | 12/2011 | Tseng et al. |
| 2012/0081550 A1 | 4/2012 | Sewell |
| 2012/0265416 A1 | 10/2012 | Lu et al. |
| 2013/0242099 A1 | 9/2013 | Sauer et al. |
| 2014/0000804 A1 | 1/2014 | Looi et al. |
| 2014/0022657 A1 | 1/2014 | Lu et al. |
| 2014/0313337 A1 | 10/2014 | Devota et al. |
| 2014/0327764 A1* | 11/2014 | Nelson .................. F16M 13/02 348/143 |
| 2014/0373345 A1 | 12/2014 | Steigerwald |

(56) References Cited

U.S. PATENT DOCUMENTS

| | | |
|---|---|---|
| 2015/0124098 A1 | 5/2015 | Winden et al. |
| 2015/0207967 A1* | 7/2015 | Fritz .................. H04N 5/2252 348/374 |
| 2015/0222795 A1 | 8/2015 | Sauer et al. |
| 2015/0266430 A1 | 9/2015 | Mleczko et al. |
| 2015/0327398 A1 | 11/2015 | Achenbach et al. |
| 2015/0365569 A1 | 12/2015 | Mai et al. |
| 2016/0037028 A1 | 2/2016 | Biemer |
| 2016/0191863 A1* | 6/2016 | Minikey, Jr. ......... H04N 5/2254 348/148 |
| 2016/0250713 A1* | 9/2016 | Wang .................. H04N 5/2253 348/373 |
| 2016/0255257 A1 | 9/2016 | Lu et al. |
| 2016/0268716 A1 | 9/2016 | Conger et al. |
| 2017/0036600 A1* | 2/2017 | Whitehead ............ H04N 5/247 |
| 2017/0054881 A1 | 2/2017 | Conger et al. |
| 2017/0129419 A1 | 5/2017 | Conger et al. |
| 2017/0133811 A1 | 5/2017 | Conger et al. |
| 2017/0201661 A1 | 7/2017 | Conger |
| 2017/0295306 A1 | 10/2017 | Mleczko |
| 2017/0302829 A1 | 10/2017 | Mleczko et al. |
| 2018/0072239 A1 | 3/2018 | Wienecke et al. |
| 2018/0098033 A1 | 4/2018 | Mleczko et al. |

FOREIGN PATENT DOCUMENTS

| | | |
|---|---|---|
| EP | 2284961 A1 | 2/2011 |
| EP | 3386822 A1 | 10/2018 |
| JP | 2012022928 A | 2/2012 |
| JP | 2017010713 A | 1/2017 |
| WO | 2016087227 A1 | 6/2016 |
| WO | 2017097658 A1 | 6/2017 |

* cited by examiner

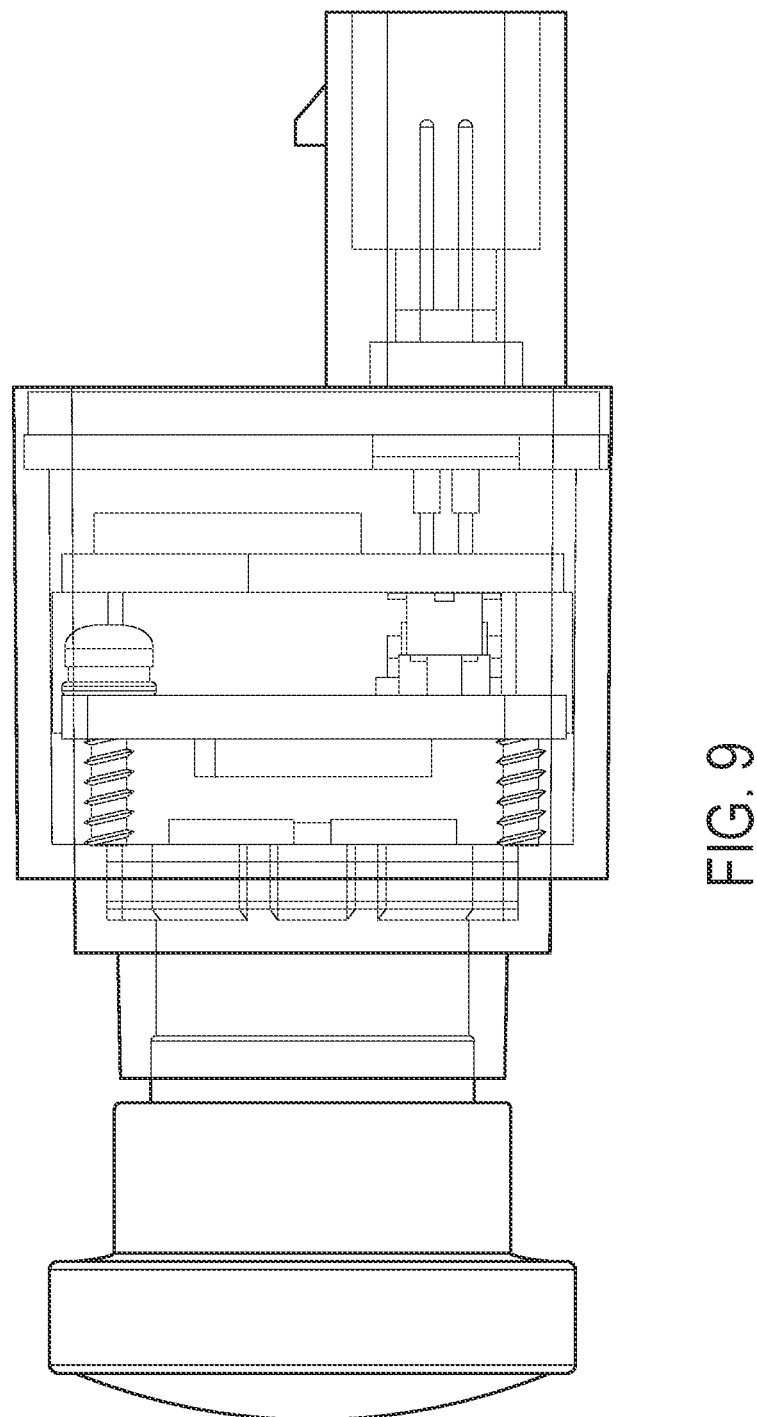

VEHICULAR CAMERA MODULE

CROSS REFERENCE TO RELATED APPLICATIONS

The present application is a continuation of U.S. patent application Ser. No. 16/679,385, filed Nov. 11, 2019, now U.S. Pat. No. 10,965,846, which is a continuation of U.S. patent application Ser. No. 16/297,790, filed Mar. 11, 2019, now U.S. Pat. No. 10,477,083, which is a continuation of U.S. patent application Ser. No. 15/487,459, filed Apr. 14, 2017, now U.S. Pat. No. 10,230,875, which claims the filing benefits of U.S. provisional application, Ser. No. 62/322,334, filed Apr. 14, 2016, which is hereby incorporated herein by reference in its entirety. And U.S. patent application Ser. No. 16/297,790 is a continuation-in-part of U.S. patent application Ser. No. 15/341,048, filed Nov. 2, 2016, now U.S. Pat. No. 10,250,004, which claims the filing benefits of U.S. provisional application Ser. No. 62/251,243, filed Nov. 5, 2015.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of cameras or imaging sensors in vehicle imaging systems is common and known. Examples of such known systems are described in U.S. Pat. Nos. 7,965,336; 5,949,331; 5,670,935 and/or 5,550,677, which are hereby incorporated herein by reference in their entireties.

SUMMARY OF THE INVENTION

The present invention provides a driver assistance system or vision system or imaging system for a vehicle that utilizes one or more cameras to capture image data representative of images exterior of the vehicle. The camera module comprises a housing that houses a printed circuit board having an imager disposed thereat. A lens holder includes a lens assembly and is attached at a front portion of the housing so that the lens assembly is optically aligned with the imager. The camera module includes a rear cover that is configured to attach at an opening at a rear portion of the housing. The rear cover includes a connecting element for electrically connecting to circuitry at the printed circuit board when the rear cover is attached at the opening at the rear portion of the housing. The rear cover also includes a connector portion, and an outer portion of the connecting element is disposed in the connector portion so as to be electrically connectable to electrically conductive elements of a vehicle connector when the camera module is disposed at the vehicle and the vehicle connector is connected to the connector portion.

These and other objects, advantages, purposes and features of the present invention will become apparent upon review of the following specification in conjunction with the drawings.

BRIEF DESCRIPTION OF THE DRAWINGS

FIG. 9 is a side elevation of a camera of the present invention, shown configured for electrical connection to a multi-pin connector of a vehicle;

DESCRIPTION OF THE PREFERRED EMBODIMENTS

A vehicle vision system and/or driver assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and provide an output to a display device for displaying images representative of the captured image data. Optionally, the vision system may provide display, such as a rearview display or a top down or bird's eye or surround view display or the like.

Figure 1:
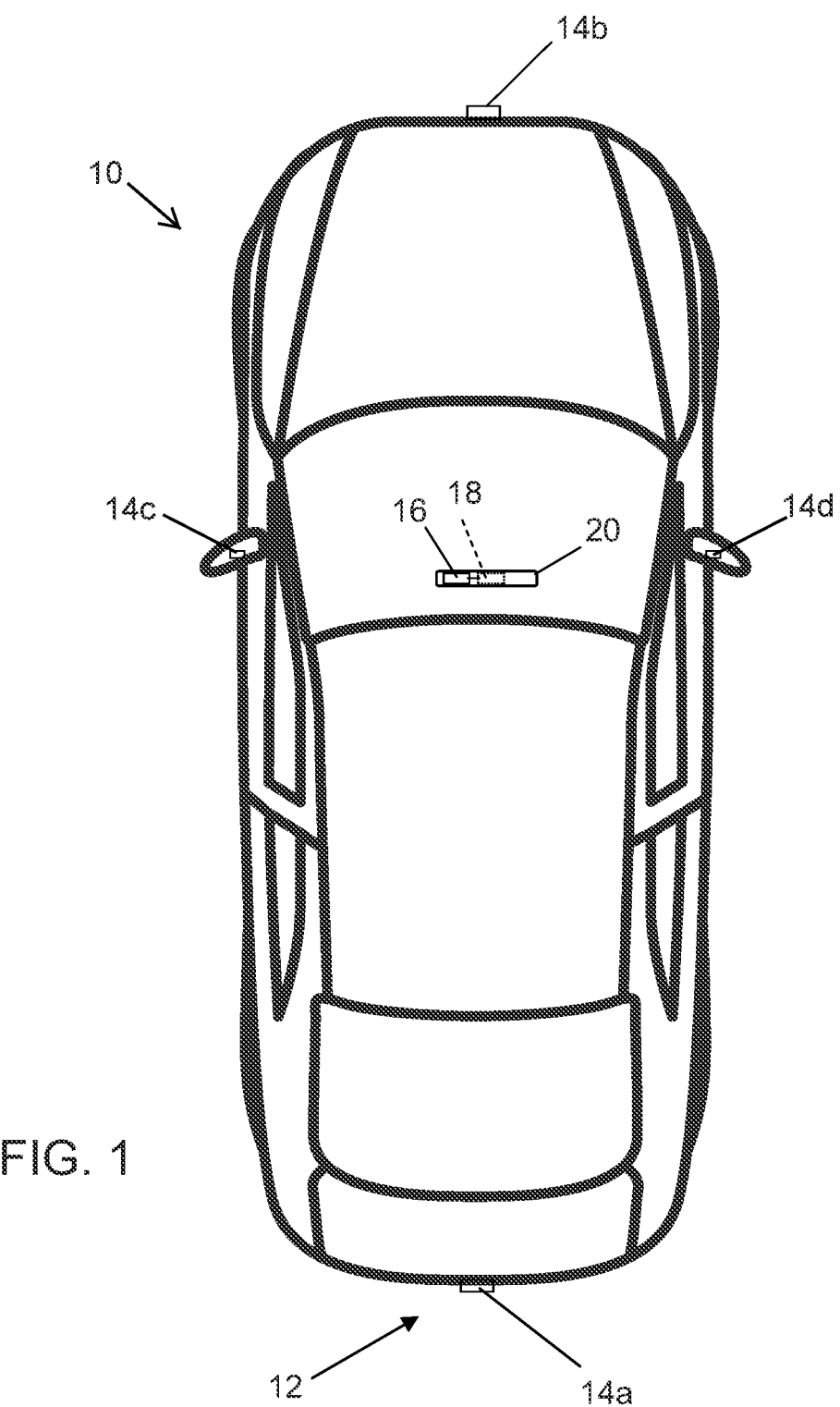
FIG. 1 is a plan view of a vehicle with a vision system that incorporates cameras in accordance with the present invention.
Figure 2:
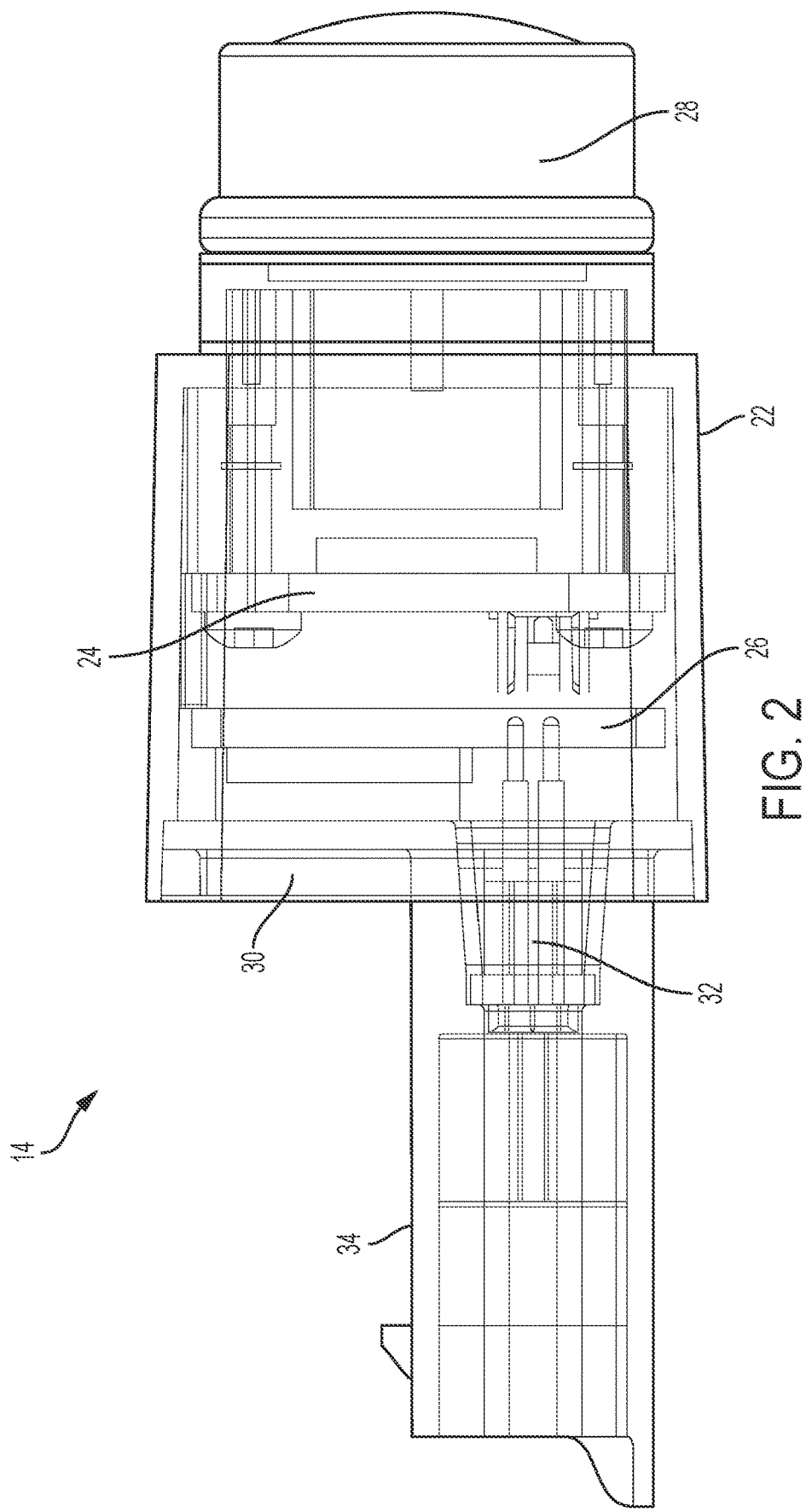
FIG. 2 is a side elevation and partial sectional view of a camera of the present invention.
Figure 3:
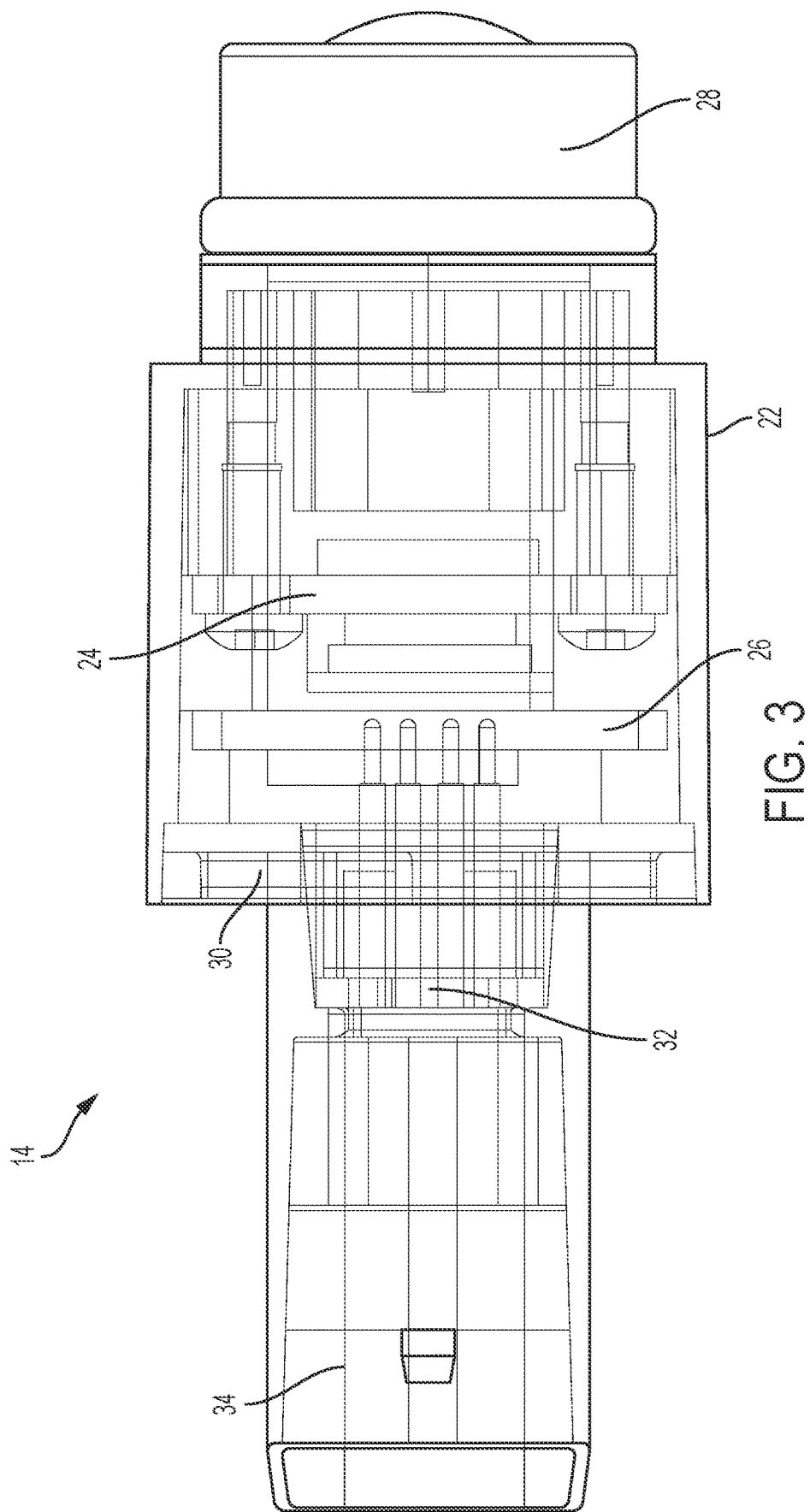
FIG. 3 is another side elevation and partial sectional view of the camera of FIG. 2.
Figure 6:
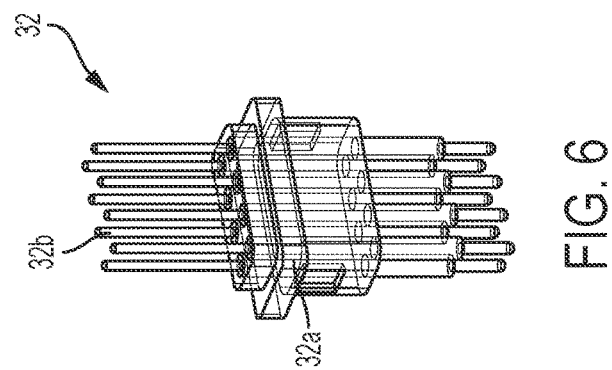
FIG. 6 is a perspective view of a connector element suitable for use with the camera module of the present invention.
Figure 5:
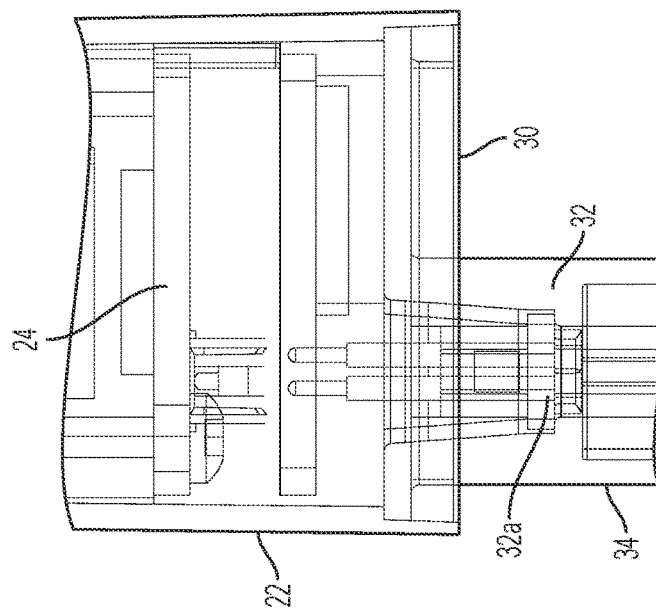
FIG. 5 is a side view of the rear portion of the camera of FIG. 4.
Figure 4:
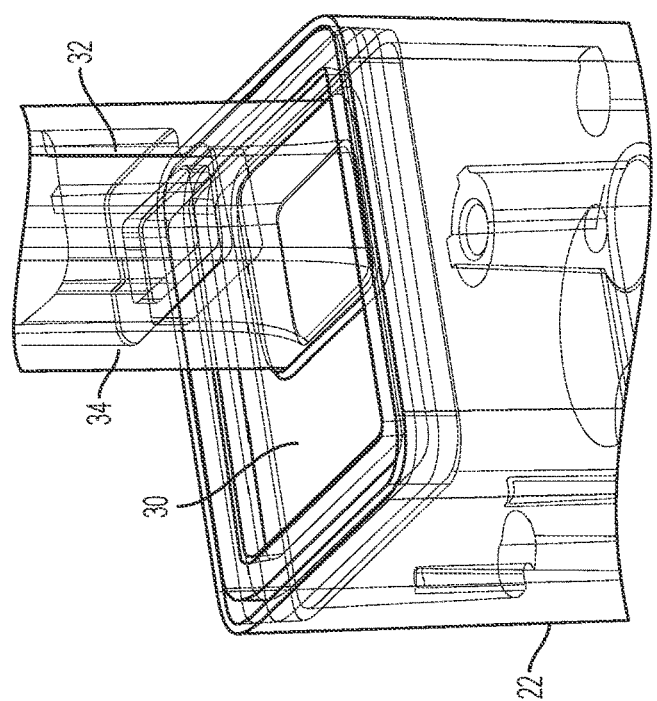
FIG. 4 is a perspective view of a rear portion of the camera of FIG. 2.
Figure 8:
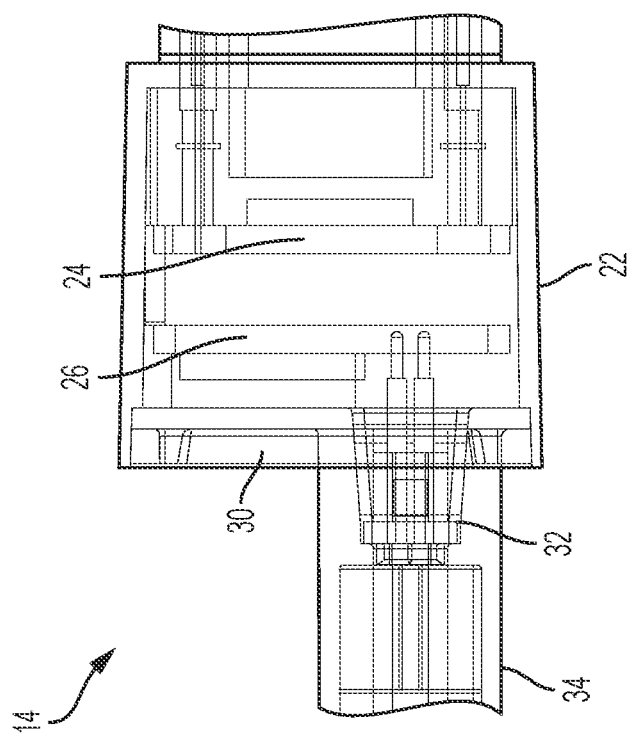
FIG. 8 is another side elevation of the camera of FIG. 2, shown without the lens holder or lens barrel.
Figure 7:
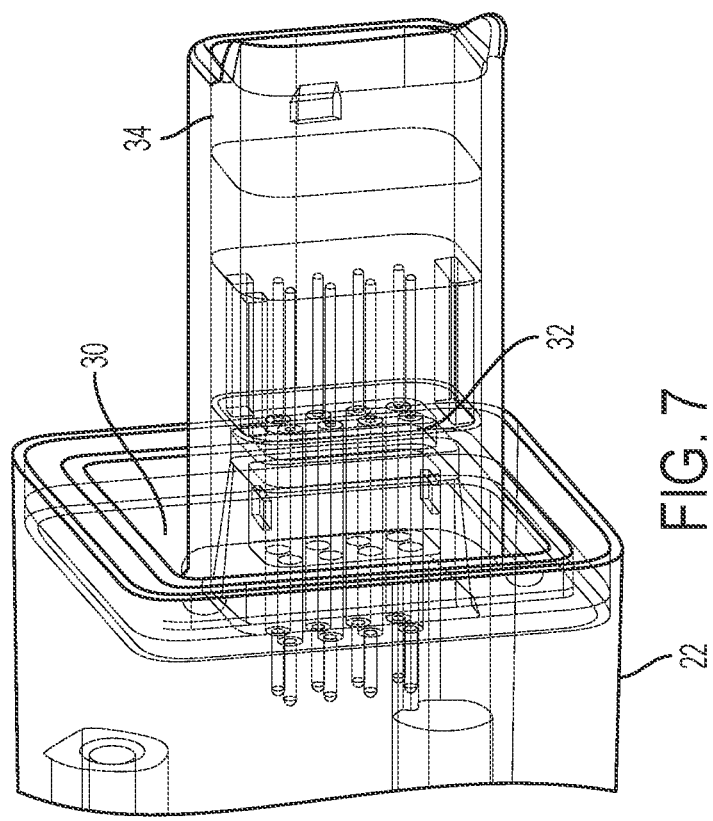
FIG. 7 is another perspective view of the rear portion of the camera of FIG. 2.

Referring now to the drawings and the illustrative embodiments depicted therein, a vehicle 10 includes an imaging system or vision system 12 that includes at least one exterior facing imaging sensor or camera, such as a rearward facing imaging sensor or camera 14a (and the system may optionally include multiple exterior facing imaging sensors or cameras, such as a forward facing camera 14b at the front (or at the windshield) of the vehicle, and a sideward/rearward facing camera 14c, 14d at respective sides of the vehicle), which captures images exterior of the vehicle, with the camera having a lens for focusing images at or onto an imaging array or imaging plane or imager of the camera (FIG. 1). Optionally, a forward viewing camera may be disposed at the windshield of the vehicle and view through the windshield and forward of the vehicle, such as for a machine vision system (such as for traffic sign recognition, headlamp control, pedestrian detection, collision avoidance, lane marker detection and/or the like). The vision system 12 includes a control or electronic control unit (ECU) or processor 18 that is operable to process image data captured by the camera or cameras and may detect objects or the like and/or provide displayed images at a display device 16 for viewing by the driver of the vehicle (although shown in FIG. 1 as being part of or incorporated in or at an interior rearview mirror assembly 20 of the vehicle, the control and/or the display device may be disposed elsewhere at or in the vehicle). The data transfer or signal communication from the camera to the ECU may comprise any suitable data or communication link, such as a vehicle network bus or the like of the equipped vehicle.

The camera module 14 has a main housing 22 (that can be metal or plastic) in which an imager printed circuit board 24 (PCB) is screwed to the main housing. This will allow better thermal transfer between the PCB and the housing. If more PCBs 26 are needed (such as for a dual or stacked PCB configuration), they can be added by attaching them electrically to the first (imager) PCB. This can be done by rigid (solder) means or by a separable connection. Additionally, thermal interface material, such as pads or paste, can be added between the PCBs and between the PCB and the housing for increased heat transfer.

The main camera housing 22 is open at its rear (opposite the lens holder portion), whereby the imager PCB and other PCB is/are inserted into the housing and attached at the front portion of the housing (at or near the lens holder 28). For example, the imager may be adjustably positioned at the housing and optically aligned with the lens of the lens holder (which may be adhesively attached at the housing) and then secured relative to the housing via fasteners or screws or the like. Optionally, the lens holder may be adhesively attached at the housing after the imager PCB is attached at the housing, whereby the optical alignment of the lens and imager is done by adjusting the lens holder relative to the housing and then curing the adhesive to secure the lens holder and lens relative to the housing and imager (such as by utilizing aspects of the cameras described in U.S. Pat. Nos. 8,542,451 and/or 9,277,104, and/or U.S. Publication No. US-2015-0124098, which are hereby incorporated herein by reference in their entireties).

The camera includes a rear cover or back plate 30 that is attached at the rear of the housing 22, and that may be at least partially received at a recess formed at the rear opening of the housing. The back plate 30 may be laser welded at the housing 22 to seal the PCBs in the camera housing.

As shown in FIGS. 2-8, the back plate 30 has an aperture for receiving and retaining a connector element 32 at the back plate. The connector element 32 comprises a body portion 32a (which is configured to be press fit into the aperture of the back plate or insert molded in the back plate) and a plurality of connecting pins or elements 32b for electrically connecting to circuitry at the PCBs in the housing when the back plate and connector element are attached at the rear of the camera housing 22. The pins may comprise adjustable or spring-loaded pins or terminals to accommodate tolerances in the location of the PCBs in the housing and the degree of insertion of the pins or elements or terminals into the housing. The pins extend through the body portion 32a so as to provide direct electrical connection between the inner pin portions that electrically connect to circuitry at the PCB and the outer pin portions that electrically connect to electrically conductive elements or terminals of the vehicle connector.

Figure 10:
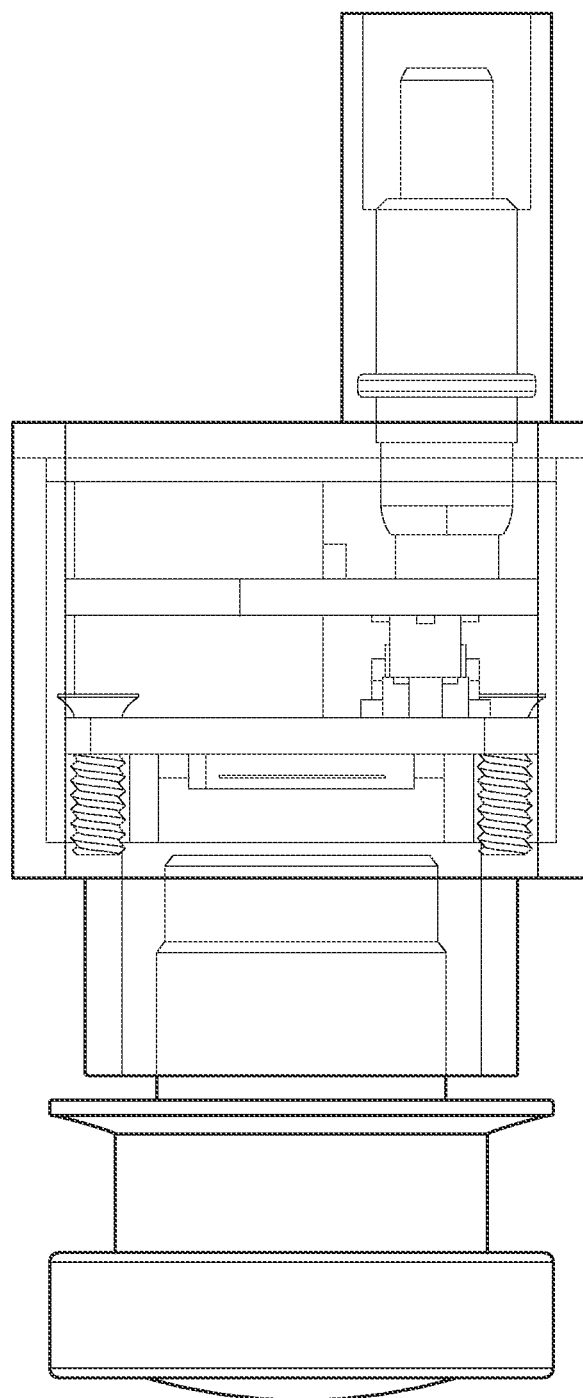
FIG. 10 is a side elevation of another camera of the present invention, shown configured for electrical connection to a coaxial connector of a vehicle.

Compliancy thus can be achieved by using some form of spring contact. In the case of a coaxial connection requirement, a coaxial spring loaded terminal can be used (see FIG. 10). Likewise, for a connection requirement of discrete signals, individual spring loaded pins can be used. Alternatively, a combination of spring tabs and contacting surfaces can be used to transfer signals between the PCB and the housing and/or between the PCB and a wire harness of the vehicle. The rear cover or back plate 30, which functions to close the main camera housing, also comprises a connector interface or harness connection point or connector 34, which can be metal or plastic.

The attachment of the rear cover or back plate to the main housing can be achieved by laser welding, ultrasonic welding, screwing, or by adhesive. If by adhesive, special care must be taken in the design to account for dimensional changes in the part through thermal cycling. Some adhesives have been found to pass 1000 hours of thermal cycling and 1000 hours of 85 degrees C./85% R. H. testing. For example, the Delo Cationic adhesive for dissimilar materials and the Delo Acrylate adhesive for metal materials have been found to be suitable adhesives.

The rear cover or back plate may be selected for a particular application of the camera, whereby the appropriate or selected connector element is inserted into the back plate to electrically connect to the circuitry of that camera. The selected connector element has the appropriate terminals or pins for electrically connecting the circuitry to the connector of the vehicle wire harness, such as a coaxial connector or a multi-pin connector, depending on the particular application of the vehicle camera.

In the illustrated embodiments, the camera comprises a metal housing. The metal rear cover may be laser welded to the metal front cover to seal the PCB and imager inside the camera housing.

Optionally, the camera may use sweg pins to hold the PCB in place (or optionally use one or more fasteners or screws to fasten or attach the PCB at the housing). Thus, the PCB may be attached without use of fasteners. For example, swegging, heat staking, spin forming, or the like may be used to attach the PCB at the housing. Optionally, forming some material from the housing that is redirected to entrap a portion of the PCB to retain its position may be done to attach the PCB without fasteners. This could be done in both plastic and metal, and is useful and beneficial because it eliminates the screws from the BOM.

Optionally, the camera may include dispensable thermal interface material that is dispensed inside the housing to disperse heat (generated by the circuitry during operation of the camera) out to the sides of the camera housing. For example, instead of thermal pads that may transfer heat in the thickness or "Z" direction, a thermal paste that is pressed into place may be forced against the sides of the housing so as to achieve enhanced heat transfer and results in lower component temperatures. The thermal paste or material is non-electrically conductive and thermally conductive so as to be able to be in contact with the circuit board and circuitry and in contact with the metal housing to provide enhanced heat transfer from the circuitry to the housing walls for cooling the camera during operation of the camera.

The camera housing optionally, and desirably, comprises a metallic material, and may be die cast, stamped, deep drawn, or impact extruded out of any suitable metal that would be appropriate for the process. For example, the material may comprise aluminum or stainless steel or the like. The camera thus may have a stamped or drawn or extruded type of housing.

The rear housing portion may be attached to the front housing portion via any suitable means, such as via screws, adhesive or welding or the like. For example, the metal housing portions may be laser welded together, such as via laser welding die cast aluminum materials or extruded aluminum materials. If laser welding die cast aluminum components, it is preferably that the metallic material or alloy comprise a high silicon content alloy, such as A360, A413, or K-alloy. The laser welding may be performed using a pulsed YAG laser, or a continuous fiber laser or the like. Stainless steel components may also be welded or laser welded together.

Figure 11:
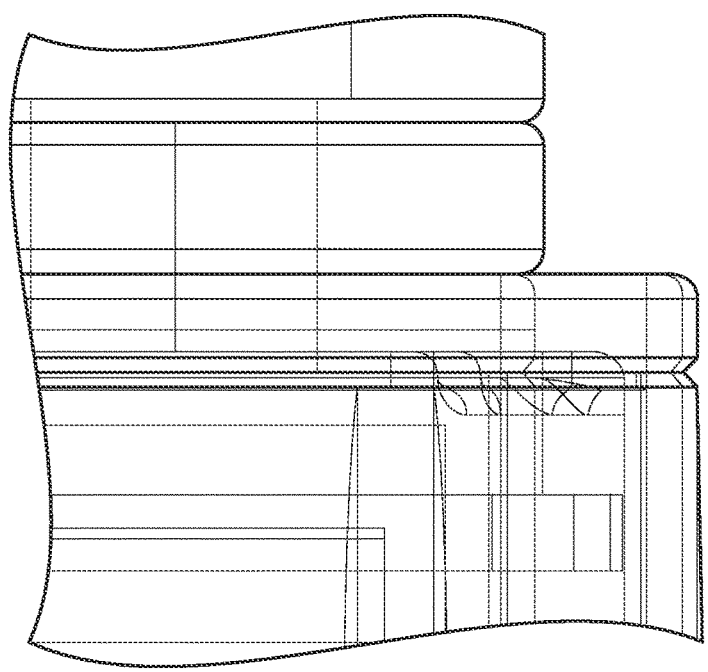
FIG. 11 is a side elevation and partial sectional view showing a butt joint between the front and rear camera housing portions.

Optionally, the camera may comprise a fixed housing (where the rear cover is fixedly positioned at the front housing portion prior to welding) or a floating housing (where the rear cover may move with respect to the front housing portion prior to welding). For the fixed rear housing design, the joint between the front and rear housing portions may comprise a butt joint (see FIG. 11), whereas for the floating rear housing configuration, a fillet weld joint may be used. The floating design may cost less as it allows for compensation for camera tolerances without using additional components or higher cost components to accommodate the inherent tolerances. The floating configuration may be achieved by use of oversized holes around fasteners, or other means of fixturing the rear housing or cover or connector part relative to the front housing part and then securing the two parts together at the appropriate relative locations (such as via tightening fasteners or ultrasonic welding or adhesive or the like). Both the floating and non-floating configurations require proper fixturing and processing to accommodate the housing shape as to allow the laser to track and stay focused on laser weld joint. This coordinated motion is achieved by using multi-axis control and manipulation of the camera and/or fixture.

Optionally, the camera may comprise an electrical spring-loaded or extendable/retractable pin connection at the connector end of the camera. Such pins may comprise discrete signal pins or coaxial signal connectors (such as described in U.S. provisional application Ser. No. 62/403,456, filed Oct. 3, 2016, which is hereby incorporated herein by reference in its entirety).

Figure 12:
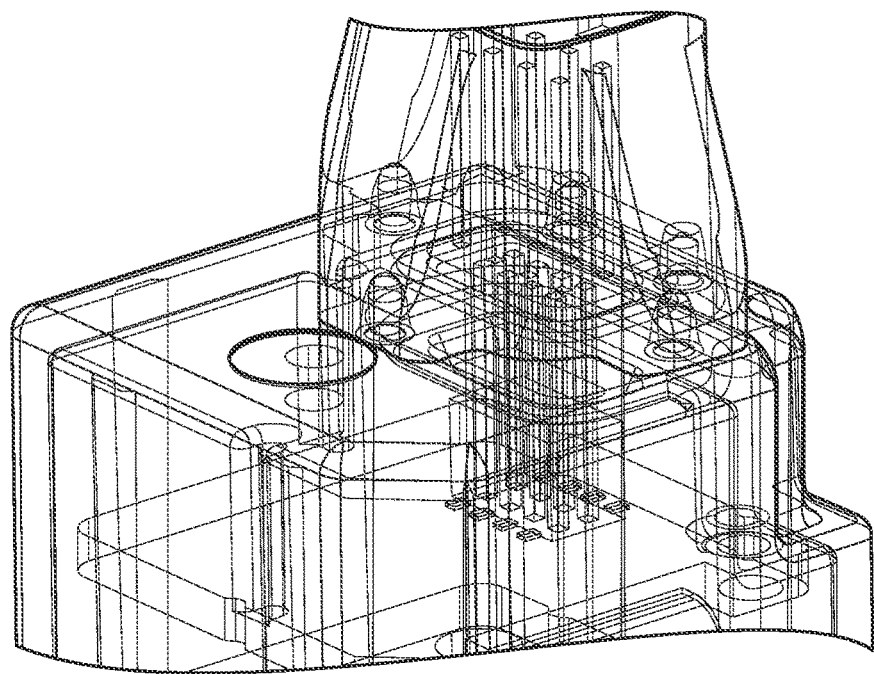
FIG. 12 is a perspective partial sectional view of another camera showing a camera assembly that allows the connector portion to "float" during assembly of the rear camera housing portion to the front camera housing portion.

In the illustrated embodiment, the rear housing is fixed at the front housing portion and the camera uses the tolerance compensating pins as compliance. Optionally, there are other means to accommodate this compliance. For example, the rear housing portion may be laser welded to the front housing portion, and the camera may use a floating connector interface to absorb the tolerances (such as by utilizing aspects of the cameras described in U.S. patent application Ser. No. 15/341,047, filed Nov. 2, 2016 and published on May 11, 2017 as U.S. Patent Publication No. US-2017-0129419, which is hereby incorporated herein by reference in its entirety). In applications where the camera comprises a metal housing, the connector portion may be attached to the metal rear housing either via screws, adhesive, swegging, heat staking, roll forming, or the like, where the camera configuration allows the connector portion to "float" during assembly (see FIG. 12), but then is fixed in place at its final assembly position while also sealing the camera housing to not let in moisture.

Thus, the camera of the present invention comprises use of spring-loaded pins to make electrical connection between a connector portion of the housing and circuitry at one or more PCBs within the housing. The pins provide the camera connection interface between the PCB and the wire harness or connector of the vehicle at which the camera is mounted. The rear housing is adhesively attached at and sealed at the front housing to seal the PCB(s) in the camera housing. Optionally, the back plate may be laser welded to the camera body. The present invention also provides for installation of the individual PCB or PCBs and applying the thermal medium and connecting the connectors in a more reliable and easier way, since the components are loaded into the camera housing from the rear and fastened or attached at the housing before the electrical connector element and back plate are attached at the housing to electrically connect to the circuitry of the PCBs and to seal the PCBs in the housing.

The camera thus may include electrical connecting elements that accommodate tolerances in the housing and/or PCB mounting and/or connector portion of the back plate. The electrical connecting elements may utilize aspects of the cameras and electrical connectors described in U.S. Pat. No. 9,233,641 and/or U.S. Publication Nos. US-2013-0242099; US-2014-0373345; US-2015-0222795; US-2015-0266430; US-2015-0365569; US-2016-0037028 and/or US-2016-0268716, and/or U.S. patent application Ser. No. 15/467,246, filed Mar. 23, 2017 and published on Jul. 13, 2017 as U.S. Patent Publication No. US-2017-0201661; Ser. No. 15/341,048, filed Nov. 2, 2016 and published on May 11, 2017 as U.S. Patent Publication No. US-2017-0133811; and/or Ser. No. 15/478,274, filed Apr. 4, 2017 and published Oct. 12, 2017 as U.S. Patent Publication US-2017-0295306, which are hereby incorporated herein by reference in their entireties.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in International Publication Nos. WO 2013/081984 and/or WO 2013/081985, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EYEQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ladar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or U.S. Publication Nos. US-2014-0340510; US-2014-0313339; US-2014-0347486; US-2014-0320658; US-2014-0336876; US-2014-0307095; US-2014-0327774; US-2014-0327772; US-2014-0320636; US-2014-0293057; US-2014-0309884; US-2014-0226012; US-2014-0293042; US-2014-0218535; US-2014-0218535; US-2014-0247354; US-2014-0247355; US-2014-0247352; US-2014-0232869; US-2014-0211009; US-2014-0160276; US-2014-0168437; US-2014-0168415; US-2014-0160291; US-2014-0152825; US-2014-0139676; US-2014-0138140; US-2014-0104426; US-2014-0098229; US-2014-0085472; US-2014-0067206; US-2014-0049646; US-2014-0052340; US-2014-0025240; US-2014-0028852; US-2014-005907; US-2013-0314503; US-2013-0298866; US-2013-0222593; US-2013-0300869; US-2013-0278769; US-2013-0258077; US-2013-0258077; US-2013-0242099; US-2013-0215271; US-2013-0141578 and/or US-2013-0002873, which are all hereby incorporated herein by reference in their entireties. The system may communicate with other communication systems via any suitable means, such as by utilizing aspects of the systems described in International Publication Nos. WO 2010/144900; WO 2013/043661 and/or WO 2013/081985, and/or U.S. Pat. No. 9,126,525, which are hereby incorporated herein by reference in their entireties.

The imaging device and control and image processor and any associated illumination source, if applicable, may comprise any suitable components, and may utilize aspects of the cameras (such as various imaging sensors or imaging array sensors or cameras or the like, such as a CMOS imaging array sensor, a CCD sensor or other sensors or the like) and vision systems described in U.S. Pat. Nos. 5,760,962; 5,715,093; 6,922,292; 6,757,109; 6,717,610; 6,590,719; 6,201,642; 5,796,094; 6,559,435; 6,831,261; 6,822,563; 6,946,978; 7,720,580; 8,542,451; 7,965,336; 7,480,149; 5,550,677; 5,877,897; 6,498,620; 5,670,935; 5,796,094; 6,396,397; 6,806,452; 6,690,268; 7,005,974; 7,937,667; 7,123,168; 7,004,606; 6,946,978; 7,038,577; 6,353,392; 6,320,176; 6,313,454 and/or 6,824,281, and/or International Publication Nos. WO 2009/036176; WO 2009/046268; WO 2010/099416; WO 2011/028686 and/or WO 2013/016409, and/or U.S. Publication Nos. US 2010-0020170 and/or US-2009-0244361, which are all hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular camera module, the vehicular camera module comprising:
a metal front housing;
a printed circuit board housed by the metal front housing, wherein the printed circuit board has a front side and has a rear side opposing the front side that is separated from the front side by a thickness of the printed circuit board, and wherein an imager is disposed at the front side of the printed circuit board;
wherein the printed circuit board is attached at the metal front housing via at least one fastener that fixedly secures the printed circuit board relative to the metal front housing;
a lens holder accommodating a lens;
wherein the lens holder is disposed at the metal front housing with the lens aligned with the imager;
wherein the imager comprises a megapixel imaging array having at least one million photosensor elements arranged in multiple rows and multiple columns;
a metal rear housing;
a coaxial connecting element having an inward-extending portion and an outward-extending portion;
wherein the metal rear housing is joined with the metal front housing;
wherein, with the metal rear housing joined with the metal front housing, the inward-extending portion of the coaxial connecting element extends inward of the metal rear housing towards the metal front housing;
wherein the inward-extending portion of the coaxial connecting element electrically connects with circuitry at the rear side of the printed circuit board;
wherein, with the metal rear housing joined with the metal front housing, the outward-extending portion of the coaxial connecting element extends outward away from the metal rear housing, and wherein the outward-extending portion of the coaxial connecting element is configured for coaxial electrical connection to a vehicle connector of a vehicle equipped with the vehicular camera module; and
wherein, with the metal rear housing joined with the metal front housing, a plurality of spring tabs make, via spring contact, an electrical connection between the circuitry at the rear side of the printed circuit board and the metal rear housing.

2. The vehicular camera module of claim 1, wherein electrical connection of the inward-extending portion of the coaxial connecting element with the circuitry at the rear side of the printed circuit board is made when the metal rear housing is joined with the metal front housing.

3. The vehicular camera module of claim 1, wherein the metal rear housing comprises a metal rear cover that, when the metal rear cover is joined with the metal front housing, closes over a rear portion of the metal front housing.

4. The vehicular camera module of claim 1, wherein the printed circuit board is attached at the metal front housing via a plurality of fasteners.

5. The vehicular camera module of claim 4, wherein the plurality of fasteners comprises a plurality of screws.

6. The vehicular camera module of claim 1, wherein the lens is secured in alignment with the imager via a cured adhesive.

7. The vehicular camera module of claim 6, wherein the lens is aligned with the imager when fabricating the vehicular camera module by adjusting the lens holder relative to the metal front housing and then curing an adhesive to secure the lens holder and lens relative to the metal front housing and to the imager.

8. The vehicular camera module of claim 1, wherein the metal rear housing is welded to the metal front housing.

9. The vehicular camera module of claim 1, wherein the metal rear housing is laser welded to the metal front housing.

10. The vehicular camera module of claim 1, wherein the metal front housing comprises a die cast aluminum front housing.

11. The vehicular camera module of claim 10, wherein the die cast aluminum front housing is formed of an alloy selected from the group consisting of (i) A360 aluminum alloy, (ii) A413 aluminum alloy and (iii) K-alloy.

12. The vehicular camera module of claim 1, wherein the metal rear housing is adhesively joined with the metal front housing.

13. The vehicular camera module of claim 1, wherein the metal front housing is formed via at least one selected from the group consisting of (i) stamping and (ii) deep-drawing.

14. The vehicular camera module of claim 1, wherein the inward-extending portion of the coaxial connecting element spring-contact connects with the circuitry at the rear side of the printed circuit board.

15. The vehicular camera module of claim 14, wherein the circuitry at the rear side of the printed circuit board that the inward-extending portion of the coaxial connecting element electrically connects with comprises an electrically conductive element attached at the rear side of the printed circuit board.

16. The vehicular camera module of claim 1, wherein the inward-extending portion of the coaxial connecting element is in spring-contact electrical connection with the circuitry at the printed circuit board via a spring-loaded terminal portion of the inward-extending portion of the coaxial connecting element.

17. The vehicular camera module of claim 1, wherein the coaxial connecting element comprises an electrically conductive pin that, with the vehicular camera module disposed at the equipped vehicle and with the outward-extending portion of the coaxial connecting element electrically connected to the vehicle connector, electrically connects between the circuitry at the rear side of the printed circuit board and an electrically conductive element of the vehicle connector.

18. The vehicular camera module of claim 17, wherein the electrically conductive pin of the coaxial connecting element comprises a spring-loaded electrically conductive pin.

19. The vehicular camera module of claim 1, wherein the inward-extending portion of the coaxial connecting element in spring-contact electrical connection with the circuitry at the rear side of the printed circuit board is at least partially received by the circuitry at the rear side of the printed circuit board.

20. The vehicular camera module of claim 1, further comprising a thermally conductive material that contacts the printed circuit board and the metal front housing to enhance heat transfer from the printed circuit board to the metal front housing during operation of the vehicular camera module, wherein the thermally conductive material comprises a non-electrically conductive material.

21. The vehicular camera module of claim 1, wherein a rear backup camera at a rear portion of the equipped vehicle comprises the vehicular camera module.

22. The vehicular camera module of claim 21, wherein the rear backup camera, when operated, captures image data for a multicamera bird's eye surround view vision system of the equipped vehicle.

23. The vehicular camera module of claim 22, wherein the multicamera bird's eye surround view vision system of the equipped vehicle further comprises a forward-viewing camera at a front portion of the equipped vehicle, a driver-side viewing camera at a left-side portion of the equipped vehicle, and a passenger-side viewing camera at a right-side portion of the equipped vehicle.

24. The vehicular camera module of claim 1, wherein a multicamera bird's eye surround view vision system of the vehicle equipped with the vehicular camera module comprises a forward-viewing camera at a front portion of the equipped vehicle, a driver-side viewing camera at a left-side portion of the equipped vehicle, a passenger-side viewing camera at a right-side portion of the equipped vehicle and a rear backup camera at a rear portion of the equipped vehicle, and wherein one selected from the group consisting of (i) the forward-viewing camera at the front portion of the equipped vehicle comprises the vehicular camera module, (ii) the driver-side viewing camera at the left-side portion of the equipped vehicle comprises the vehicular camera module, (iii) the passenger-side viewing camera at the right-side portion of the equipped vehicle comprises the vehicular camera module and (iv) the rear backup camera at the rear portion of the equipped vehicle comprises the vehicular camera module.

25. The vehicular camera module of claim 24, wherein the driver-side viewing camera at the left-side portion of the equipped vehicle comprises the vehicular camera module.

26. The vehicular camera module of claim 25, wherein a driver-side exterior rearview mirror assembly of the equipped vehicle accommodates the driver-side viewing camera.

27. A vehicular camera module, the vehicular camera module comprising:
   a metal front housing;
   a printed circuit board housed by the metal front housing, wherein the printed circuit board has a front side and has a rear side opposing the front side that is separated from the front side by a thickness of the printed circuit board, and wherein an imager is disposed at the front side of the printed circuit board;
   wherein the printed circuit board is attached at the metal front housing via a plurality of screws that fixedly secures the printed circuit board relative to the metal front housing;
   a lens holder accommodating a lens;
   wherein the lens holder is disposed at the metal front housing with the lens aligned with the imager;
   wherein the imager comprises a megapixel CMOS imaging array having at least one million photosensor elements arranged in multiple rows and multiple columns;
   a metal rear housing;
   a coaxial connecting element having an inward-extending portion and an outward-extending portion;
   wherein the metal rear housing is joined with the metal front housing;
   wherein, with the metal rear housing joined with the metal front housing, the inward-extending portion of the coaxial connecting element extends inward of the metal rear housing towards the metal front housing;
   wherein (i) the inward-extending portion of the coaxial connecting element electrically connects via spring contact with circuitry at the rear side of the printed circuit board and (ii) with the metal rear housing joined with the metal front housing, a plurality of spring tabs make, via spring contact, an electrical connection between the circuitry at the rear side of the printed circuit board and the metal rear housing;

wherein, with the metal rear housing joined with the metal front housing, the outward-extending portion of the coaxial connecting element extends outward away from the metal rear housing, and wherein the outward-extending portion of the coaxial connecting element is configured for coaxial electrical connection to a vehicle connector of a vehicle equipped with the vehicular camera module;

wherein a multicamera bird's eye surround view vision system of the vehicle equipped with the vehicular camera module comprises a forward-viewing camera at a front portion of the equipped vehicle, a driver-side viewing camera at a left-side portion of the equipped vehicle, a passenger-side viewing camera at a right-side portion of the equipped vehicle and a rear backup camera at a rear portion of the equipped vehicle; and wherein one selected from the group consisting of (i) the forward-viewing camera at the front portion of the equipped vehicle comprises the vehicular camera module, (ii) the driver-side viewing camera at the left-side portion of the equipped vehicle comprises the vehicular camera module, (iii) the passenger-side viewing camera at the right-side portion of the equipped vehicle comprises the vehicular camera module and (iv) the rear backup camera at the rear portion of the equipped vehicle comprises the vehicular camera module.

28. The vehicular camera module of claim 27, wherein the metal rear housing is welded to the metal front housing.

29. The vehicular camera module of claim 27, wherein the metal rear housing is laser welded to the metal front housing.

30. The vehicular camera module of claim 27, wherein the metal front housing comprises a die cast aluminum front housing.

31. The vehicular camera module of claim 30, wherein the die cast aluminum front housing is formed of an alloy selected from the group consisting of (i) A360 aluminum alloy, (ii) A413 aluminum alloy and (iii) K-alloy.

32. The vehicular camera module of claim 27, wherein the metal rear housing is adhesively joined with the metal front housing.

33. The vehicular camera module of claim 27, wherein the metal front housing is formed via at least one selected from the group consisting of (i) stamping and (ii) deep-drawing.

34. The vehicular camera module of claim 27, wherein the inward-extending portion of the coaxial connecting element is in spring-contact electrical connection with the circuitry at the printed circuit board via a spring-loaded terminal portion of the inward-extending portion of the coaxial connecting element.

35. The vehicular camera module of claim 27, wherein the coaxial connecting element comprises an electrically conductive pin that, with the vehicular camera module disposed at the equipped vehicle and with the outward-extending portion of the coaxial connecting element electrically connected to the vehicle connector, electrically connects between the circuitry at the rear side of the printed circuit board and an electrically conductive element of the vehicle connector.

36. The vehicular camera module of claim 27, wherein the inward-extending portion of the coaxial connecting element in spring-contact electrical connection with the circuitry at the rear side of the printed circuit board is at least partially received by the circuitry at the rear side of the printed circuit board.

37. The vehicular camera module of claim 27, wherein the lens is secured in alignment with the imager via a cured adhesive.

38. The vehicular camera module of claim 37, wherein the lens is aligned with the imager when fabricating the vehicular camera module by adjusting the lens holder relative to the metal front housing and then curing an adhesive to secure the lens holder and lens relative to the metal front housing and to the imager.

39. The vehicular camera module of claim 27, wherein the circuitry at the rear side of the printed circuit board that the inward-extending portion of the coaxial connecting element electrically connects with comprises an electrically conductive element attached at the rear side of the printed circuit board.

40. The vehicular camera module of claim 27, wherein the driver-side viewing camera at the left-side portion of the equipped vehicle comprises the vehicular camera module.

41. The vehicular camera module of claim 40, wherein a driver-side exterior rearview mirror assembly of the equipped vehicle accommodates the driver-side viewing camera.

42. The vehicular camera module of claim 41, wherein the metal front housing comprises an aluminum front housing.

43. The vehicular camera module of claim 27, wherein the rear backup camera at the rear portion of the equipped vehicle comprises the vehicular camera module.

44. A vehicular camera module, the vehicular camera module comprising:

a metal front housing;

a printed circuit board housed by the metal front housing, wherein the printed circuit board has a front side and has a rear side opposing the front side that is separated from the front side by a thickness of the printed circuit board, and wherein an imager is disposed at the front side of the printed circuit board;

wherein the printed circuit board is attached at the metal front housing via a plurality of screws that fixedly secures the printed circuit board relative to the metal front housing;

a lens holder accommodating a lens;

wherein the lens holder is disposed at the metal front housing with the lens aligned with the imager;

wherein the imager comprises a megapixel CMOS imaging array having at least one million photosensor elements arranged in multiple rows and multiple columns;

wherein the lens is secured in alignment with the imager via a cured adhesive;

a metal rear housing;

a coaxial connecting element having an inward-extending portion and an outward-extending portion;

wherein the metal rear housing is joined with the metal front housing;

wherein, with the metal rear housing joined with the metal front housing, the inward-extending portion of the coaxial connecting element extends inward of the metal rear housing towards the metal front housing;

wherein the inward-extending portion of the coaxial connecting element electrically connects with circuitry at the rear side of the printed circuit board;

wherein, with the metal rear housing joined with the metal front housing, the outward-extending portion of the coaxial connecting element extends outward away from the metal rear housing, and wherein the outward-extending portion of the coaxial connecting element is configured for coaxial electrical connection to a vehicle connector of a vehicle equipped with the vehicular camera module; and wherein, with the metal rear housing joined with the metal front housing, a plurality of spring tabs make, via spring contact, an electrical connection between the circuitry at the rear side of the printed circuit board and the metal rear housing.

45. The vehicular camera module of claim 44, wherein the metal rear housing is welded to the metal front housing.

46. The vehicular camera module of claim 44, wherein the metal rear housing is laser welded to the metal front housing.

47. The vehicular camera module of claim 44, wherein the metal front housing comprises a die cast aluminum front housing.

48. The vehicular camera module of claim 47, wherein the die cast aluminum front housing is formed of an alloy selected from the group consisting of (i) A360 aluminum alloy, (ii) A413 aluminum alloy and (iii) K-alloy.

49. The vehicular camera module of claim 44, wherein the metal rear housing is adhesively joined with the metal front housing.

50. The vehicular camera module of claim 44, wherein the metal front housing is formed via at least one selected from the group consisting of (i) stamping and (ii) deep-drawing.

51. The vehicular camera module of claim 44, wherein the circuitry at the rear side of the printed circuit board that the inward-extending portion of the coaxial connecting element electrically connects with comprises an electrically conductive element attached at the rear side of the printed circuit board.

52. The vehicular camera module of claim 51, wherein a multicamera bird's eye surround view vision system of the vehicle equipped with the vehicular camera module comprises a forward-viewing camera at a front portion of the equipped vehicle, a driver-side viewing camera at a left-side portion of the equipped vehicle, a passenger-side viewing camera at a right-side portion of the equipped vehicle and a rear backup camera at a rear portion of the equipped vehicle, and wherein one selected from the group consisting of (i) the forward-viewing camera at the front portion of the equipped vehicle comprises the vehicular camera module, (ii) the driver-side viewing camera at the left-side portion of the equipped vehicle comprises the vehicular camera module, (iii) the passenger-side viewing camera at the right-side portion of the equipped vehicle comprises the vehicular camera module and (iv) the rear backup camera at the rear portion of the equipped vehicle comprises the vehicular camera module.

53. The vehicular camera module of claim 52, wherein the driver-side viewing camera at the left-side portion of the equipped vehicle comprises the vehicular camera module.

54. The vehicular camera module of claim 53, wherein a driver-side exterior rearview mirror assembly of the equipped vehicle accommodates the driver-side viewing camera.

55. The vehicular camera module of claim 52, wherein the rear backup camera at the rear portion of the equipped vehicle comprises the vehicular camera module.

56. The vehicular camera module of claim 44, wherein the inward-extending portion of the coaxial connecting element spring-contact connects with the circuitry at the rear side of the printed circuit board.

57. The vehicular camera module of claim 56, wherein the inward-extending portion of the coaxial connecting element in spring-contact electrical connection with the circuitry at the rear side of the printed circuit board is at least partially received by the circuitry at the rear side of the printed circuit board.

58. The vehicular camera module of claim 44, wherein the lens is aligned with the imager when fabricating the vehicular camera module by adjusting the lens holder relative to the metal front housing and then curing an adhesive to secure the lens holder and lens relative to the metal front housing and to the imager.

* * * * *